(12) United States Patent
Kim

(10) Patent No.: US 6,920,097 B2
(45) Date of Patent: Jul. 19, 2005

(54) METHOD OF AND APPARATUS FOR CONTROLLING WRITING POWER IN AN OPTICAL DRIVE

(75) Inventor: Joo-youp Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 562 days.

(21) Appl. No.: 09/976,460

(22) Filed: Oct. 15, 2001

(65) Prior Publication Data

US 2002/0126603 A1 Sep. 12, 2002

(30) Foreign Application Priority Data

Jan. 20, 2001 (KR) .......................................... 2001-3417

(51) Int. Cl.[7] .............................................. G11B 7/125
(52) U.S. Cl. ................................................. 369/47.53
(58) Field of Search ...................................... 369/47.53

(56) References Cited

U.S. PATENT DOCUMENTS 6,557,126 B1 * 4/2003 Kelly .......................... 714/708
6,621,780 B2 * 9/2003 Suzuki ..................... 369/47.53

* cited by examiner

*Primary Examiner*—A M Psitos
(74) *Attorney, Agent, or Firm*—Staas & Halsey LLP

(57) ABSTRACT

An apparatus for and a method of performing running optimum power control (OPC) of a laser diode writing power in an optical drive. The apparatus and method obtain an optimum writing characteristic where the writing environment of the optical drive changes. A first normalized write signal having a first linear characteristic with respect to writing power is detected using predetermined condition values to set a first normalized write signal as a reference signal. A second normalized write signal having a second linear characteristic with respect to writing power is detected using the predetermined condition values, while writing data to a user area on the optical medium. The writing power of the laser diode is controlled based on determining whether the second normalized write signal is approximate to the first normalized write signal.

15 Claims, 8 Drawing Sheets

METHOD OF AND APPARATUS FOR CONTROLLING WRITING POWER IN AN OPTICAL DRIVE

CROSS REFERENCE TO RELATED APPLICATIONS

This application claims the benefit of Korean Application No. 2001-3417 filed Jan. 20, 2001 in the Korean Patent Office, the disclosure of which is incorporated herein by reference.

BACKGROUND OF THE INVENTION

1. Field of the Invention

The present invention relates to a method of and an apparatus for controlling writing power in an optical drive, and more particularly, to a method of and an apparatus for controlling power for driving a laser diode (LD) in a write mode, thereby obtaining an optimum writing characteristic where a writing environment changes.

2. Description of the Related Art

Conventional optical drives control a level of laser power (or writing power) necessary for writing data to an optical medium such as a Compact Disc Recordable (CD-R) or a Compact Disc ReWritable (CD-RW), to which data may be additionally written or rewritten, using a power calibration area (PCA) on the optical medium in a write mode. This control is referred to as an optimum power control (OPC).

Even where optimum writing power is obtained due to OPC, a satisfactory writing characteristic is not attained where a writing environment changes in an actual write mode. For example, where fluctuation in power sensitivity occurs between different positions on an optical medium, where a wavelength of an LD shifts due to a high temperature, where a deviation occurs in a beam spot due to disc skew, the thickness of a disc or defocus, or where disc and/or optical conditions change because actual writing is performed long after OPC is performed, optimum writing power determined by the OPC changes, thereby modifying the beta or asymmetry of a written signal. The term beta describes asymmetry between a top level and a bottom level of an AC-coupled RF signal. Consequently, a satisfactory writing characteristic is not attained.

Figure 1A:
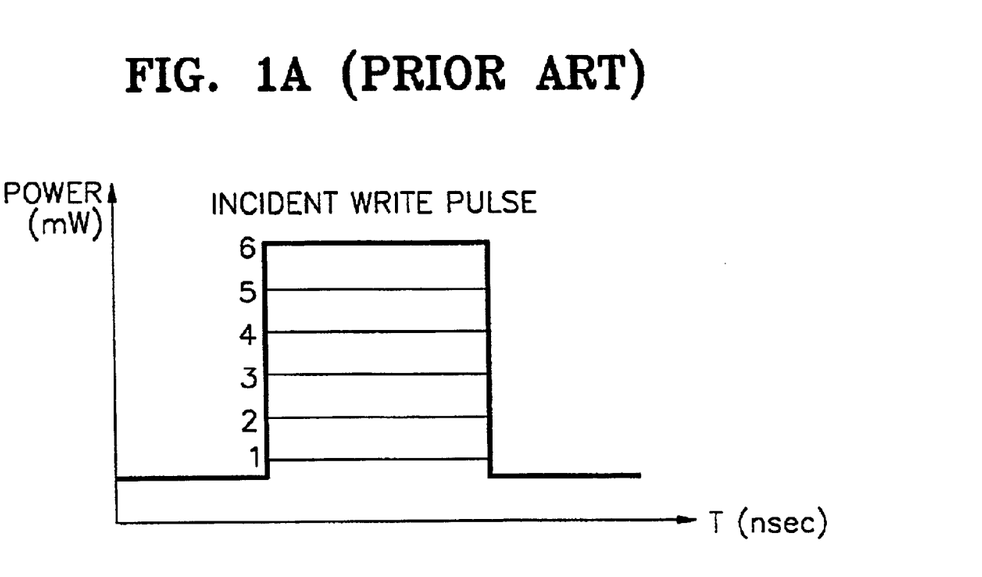
FIGS. 1A and 1B are diagrams showing the relation between an incident write pulse and a reflected write pulse with respect to a pit when data is written to an optical disc.
Figure 1B:
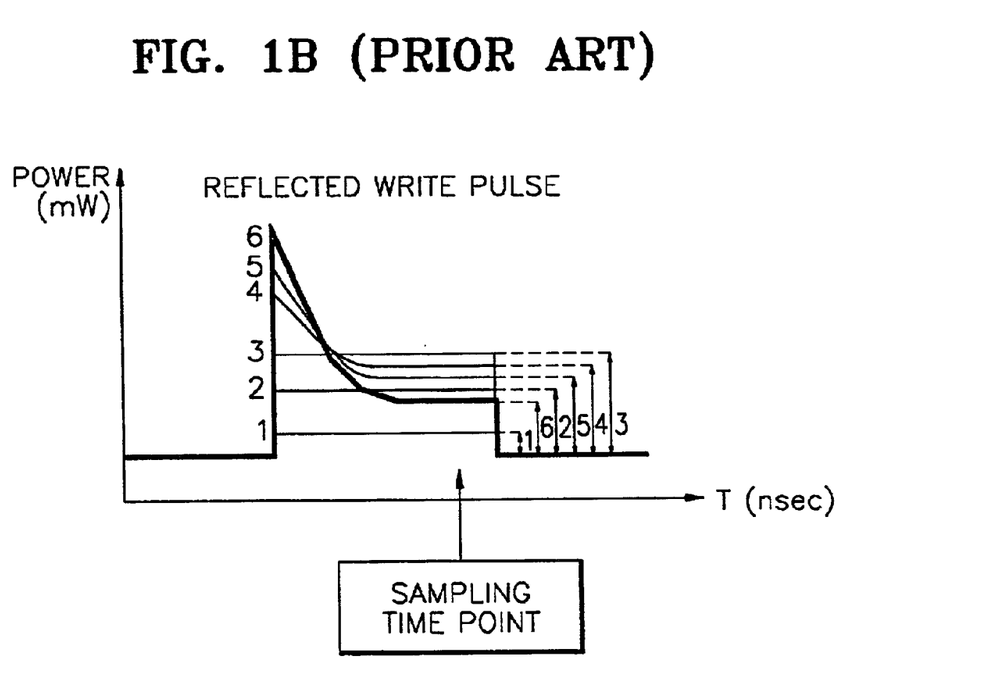

To overcome this problem, running OPC has been proposed to control the writing power of an LD such that an optimum writing characteristic is attained even where a writing environment changes in the course of writing data. According to conventional OPC, in a case where a write pulse incident on an optical medium is generated, as shown as writing power versus time in FIG. 1A, a level of a write pulse reflected from the optical medium decreases at a data recordable side of the optical medium when a pit starts to be formed on the optical medium, as shown in FIG. 1B. As shown in FIG. 1A, a peak level of an incident write pulse increases where incident writing power increases from a level 1 to a level 6. As shown in FIG. 1B, as the incident writing power increases from the level 1 to a level 3, the peak level of a reflected write pulse also increases. However, the peak level of a reflected write pulse rapidly drops and then levels off so that the reflected write pulse has a nonlinear characteristic at each of the fourth through sixth levels of the incident writing power, since reflectance decreases by forming a pit on a data recordable side. The reflected writing pulse is sampled when the peak level of the reflected write pulse is constant, as shown in FIG. 1B.

Figure 2:
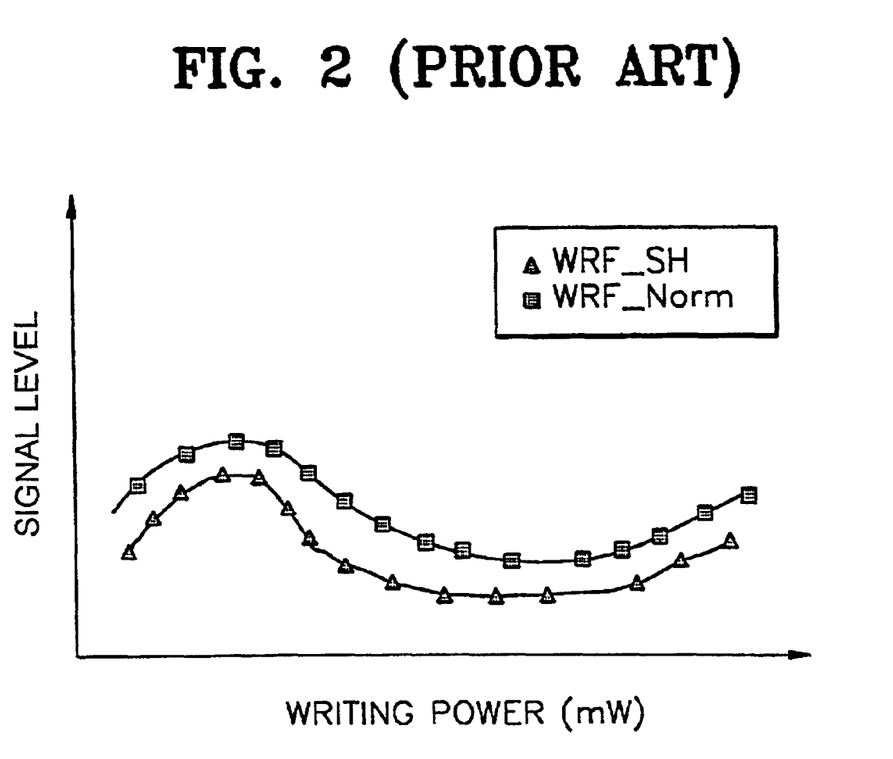
FIG. 2 is a graph of the relation between a sampled and held radio frequency (RF) signal corresponding to the quantity of reflected light and writing power according to prior art.

According to a relation between the incident write pulse and the reflected write pulse, a radio frequency (RF) signal (referred to as a WRF__SH), which is obtained by sampling and holding a signal (referred to as a WRF) corresponding to the quantity of light reflected by the optical medium, has a nonlinear characteristic with respect to the writing power, as illustrated by Δ in FIG. 2. Accordingly, the conventional running OPC is realized such that WRF__SH is divided by a signal (referred to as a MPDO__SH), which is obtained by sampling and holding the output signal (referred to as a MPDO) from a monitoring photo diode, to obtain a normalized write RF signal (referred to as a WRF__Norm) having a linear characteristic with respect to writing power, as illustrated by □ in FIG. 2, according to Equation (1), thereby controlling the writing power of an LD.

$$\text{WRF\_Norm} = \frac{\text{WRF\_SH}}{\text{MPDO\_SH}} \qquad (1)$$

However, since values of the WRF and the MPDO are not suitable for obtaining a sufficient dynamic range in hardware, WRF__Norm obtained using WRF__SH and MPDO__SH has a nonlinear characteristic, as shown in FIG. 2. Accordingly, when skew exists due to an optical medium or a deck mechanism, where the wavelength of the LD changes due to high temperature, or where deviation occurs in an optical medium, control of the writing power of the LD to be in an optimum state becomes impossible. As a result, a difference between a beta of a signal written to an inner track and a beta of a signal written to an outer track on an optical medium increases, and a pit deviation between the inner track and the outer track also increases. As such, a difference in a land jitter between the inner track and the outer track increases so that it is difficult to attain a satisfactory writing characteristic.

SUMMARY OF THE INVENTION

To solve the above problem, it is an object of the present invention to provide a method of and an apparatus for controlling writing power to an optical medium to perform running optimum power control (OPC). According to the present invention a deficiency in dynamic ranges of monitored writing power and a write radio frequency (RF) signal, which are difficult to compensate in hardware, is compensated for in firmware (or software) and a normalized write RF signal having a constant linear characteristic is obtained to control the writing power of a laser diode while an optical drive is in a write mode, thereby attaining an optimum writing characteristic where the writing environment of the optical drive changes.

Additional objects and advantages of the invention will be set forth in part in the description which follows, and, in part, will be obvious from the description, or may be learned by practice of the invention.

Accordingly, to achieve the above and other objects of the invention, there is provided a method of controlling optimum writing power of a light source which emits a beam to write data to an optical medium in an optical drive. The method comprises detecting a first normalized write signal having a linear characteristic with respect to writing power by using predetermined condition values, wherein the predetermined condition values are set taking into account the dynamic ranges of monitored writing power and a write RF signal, deficiency in the dynamic ranges not being compensated for in hardware in the optical drive, while writing random data to a test area within a power calibration area on the optical medium, and setting the first normalized write signal as a reference signal; detecting a second normalized write signal having a linear characteristic with respect to writing power using the predetermined condition values, while writing data to a user area on the optical medium; and controlling the writing power of the light source based on a result of determining whether the second normalized write signal is approximate in value to a value of the first normalized write signal.

The present invention also provides an apparatus for controlling writing power of a light source which emits a beam to write data to an optical medium in an optical drive. A first sampling and hold unit samples and holds a signal corresponding to a quantity of light reflected from the optical medium. A second sampling and hold unit samples and holds a signal obtained by monitoring a quantity of light radiated by the light source. A controller performs operations on predetermined condition values, which are set taking into account the dynamic ranges of monitored writing power and a write RF signal, deficiency in the dynamic ranges not being compensated in hardware in the optical drive, and on signals output from the first and second sampling and hold units, detects a normalized write signal having a linear characteristic with respect to the writing power of the light source, and controls the writing power, in a write mode.

BRIEF DESCRIPTION OF THE DRAWINGS

The above objective and advantages of the present invention will become more apparent by describing in detail embodiments thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 3:
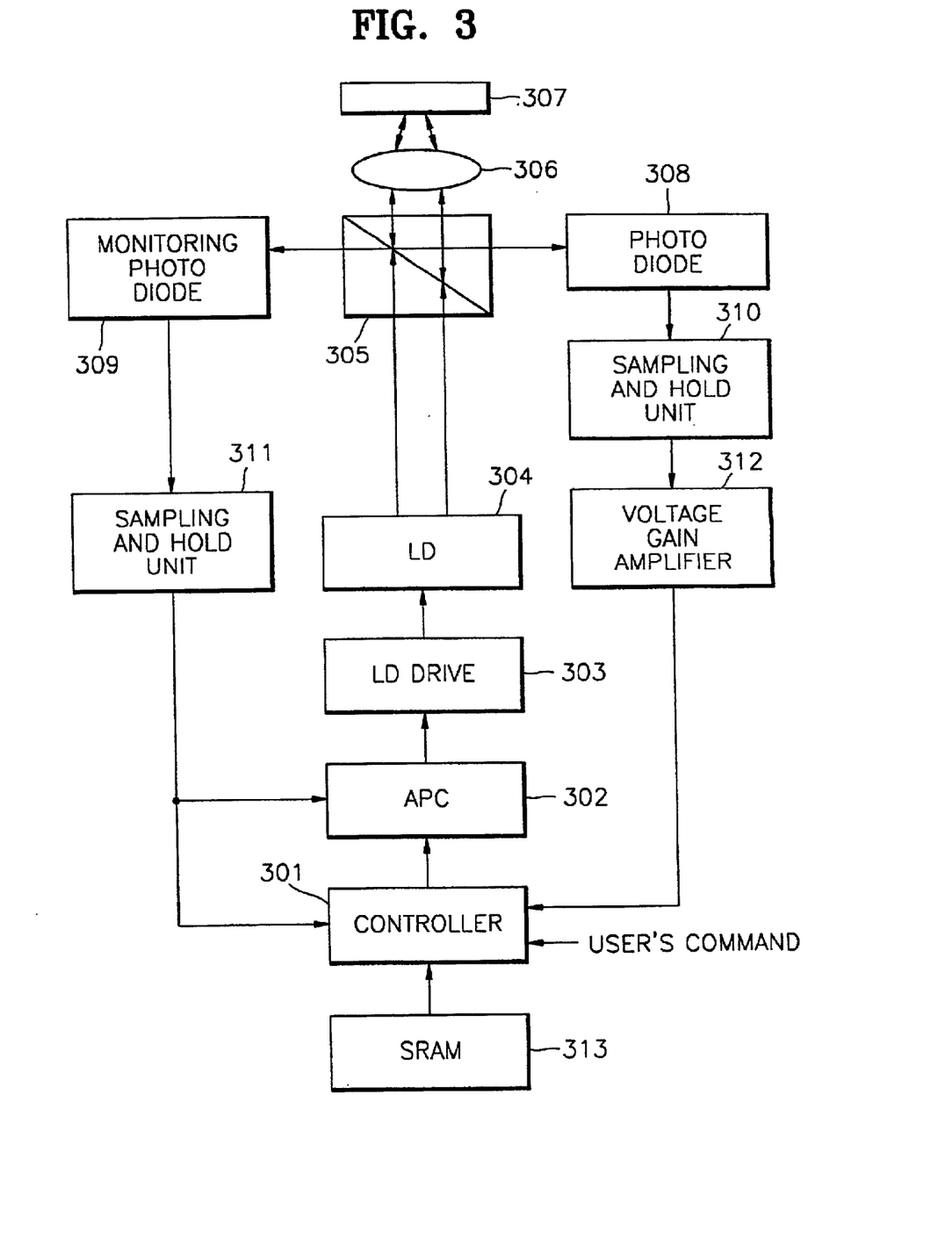
FIG. 3 is a functional block diagram of an optical drive incorporating an apparatus for controlling writing power according to the present invention.

Referring to FIG. 3, an optical drive for controlling writing power according to the present invention comprises a controller 301, an automatic power controller (APC) 302, a laser diode (LD) drive 303, an LD 304, a beam splitter 305, an objective lens 306, a photo diode 308, a monitoring photo diode 309, sampling and hold units 310 and 311, a voltage gain amplifier 312, and a static random access memory (SRAM) 313. The optical drive records/reads information to/from an optical medium 307 such as, for example, a CD-R or a CD-RW.

While data is written to the optical medium 307 in a write mode in response to a user's command, the controller 301 detects a normalized write radio frequency (RF) signal (referred to as WRF_Norm) having a linear characteristic with respect to writing power, and outputs a base voltage level for controlling the writing power of the LD 304 and a compensation voltage level, which is compensated for due to running optimum power control (OPC), to the APC 302 so that the writing power of the LD 304 is controlled to be optimized according to the present invention. Particularly, in order to determine WRF_Norm, operations are performed on a sampled and held write RF signal (referred to as a WRF_SH) transmitted from the voltage gain amplifier 312, a monitoring photo diode output signal (referred to as a MPDO_SH) after being sampled and held by the sampling and hold unit 311, and predetermined condition values which are considered to extend a previously set dynamic range in firmware, according to Equation (2).

$$\text{WRF\_Norm} = \frac{\text{WRF\_SH} \times N - J}{\text{MPDO\_SH} \times M - I} \quad (2)$$

In equation (2), WRF_Norm indicates a write RF signal normalized based on monitored writing power; WRF_SH indicates a write RF signal, which is obtained from the quantity of light reflected by the optical medium 307 and detected by the photo diode 308, after being sampled and held; N and J indicate a slope (or gain) and an offset, respectively, of the WRF_SH where N and J are obtained from simulations and tests to extend a dynamic range of the WRF_SH in firmware; MPDO_SH indicates a signal, which is obtained by sampling and holding a signal obtained by monitoring a beam emitted from a light source, i.e., the LD 304; M and I indicate a gain and an offset, respectively, for amplifying the MPDO_SH so that the WRF_Norm has a linear characteristic with respect to writing power; and I and J are integers.

The APC 302 controls the base voltage level and the compensation voltage level received from the controller 301 using the MPDO_SH received from the sampling and hold unit 311 so that constant writing power is supplied to the LD drive 303.

The LD drive 303 drives the LD 304 depending on a power control signal received from the APC 302 so that the LD 304 radiates a beam toward the optical medium 307. The beam splitter 305 splits the beam radiated by the LD 304 so that the beam is radiated toward the objective lens 306 and toward the monitoring photo diode 309. The beam splitter 305 also splits light reflected from the optical medium 307 back through the objective lens 306 so that the reflected light is radiated toward the photo diode 308. The objective lens 306 focuses the beam received from the beam splitter 305 on the optical medium 307 and transmits the light reflected from the optical medium 307 to the beam splitter 305.

The photo diode 308 is driven by the light reflected by the optical medium 307 and received through the objective lens 306 and the beam splitter 305, and outputs a write RF signal (referred to as WRF). The sampling and hold unit 310 samples and holds the WRF from the photo diode 308 at a predetermined time and outputs WRF_SH. Here, the predetermined time may be set as, for example, 11T, where T is 1/f, so 11T corresponds to 11 clock pulses. Accordingly, where the predetermined time is 11T, the sampling and hold unit 310 samples the WRF transmitted from the photo diode 308 whenever a pit with a size of 11T is formed on the optical medium 307 in a write mode. The voltage gain amplifier 312 amplifies the voltage of the WRF_SH output from the sampling and hold unit 310 so that the voltage has a predetermined value, and then transmits the voltage to the controller 301.

Meanwhile, the monitoring photo diode 309 is driven by the beam radiated by the LD 304 through the beam splitter 305, and outputs a monitoring photo diode output signal (referred to as a MPDO). The sampling and hold unit 311 samples and holds the MPDO, which is received from the monitoring photo diode 309, at a predetermined time and outputs MPDO_SH. The MPDO_SH is transmitted to the APC 302 and the controller 301.

The SRAM 313 stores the base voltage level for controlling the writing power of the LD 304, which is detected according to OPC performed at an initial stage of a write mode, and stores the WRF_Norm as a reference signal.

Figure 4:
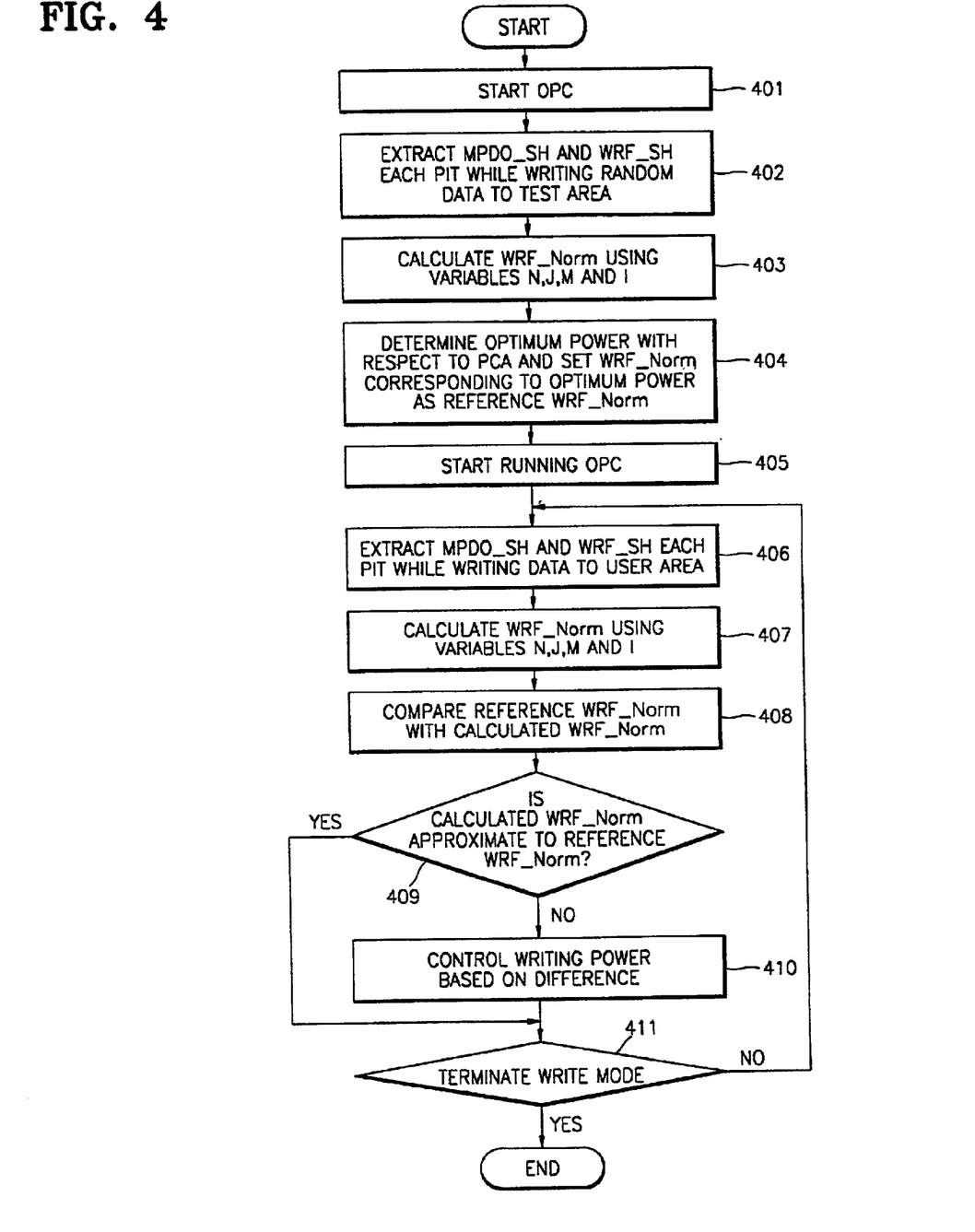
FIG. 4 is a flowchart of a method according to the present invention.

FIG. 4 is a flowchart of a method of controlling writing power in an optical drive according to the present invention. The method will be described with reference to FIGS. 3 and 4. Once a write mode is selected according to a user's command, in operation 401 the controller 301 starts OPC. In operation 402, the controller 301 controls the writing power of the LD 304 through the APC 302 and the LD drive 303 so that random data is written to a power calibration area (PCA) on the optical medium 307, and extracts WRF_SH through the photo diode 308, the sampling and hold unit 310 and the voltage gain amplifier 312, and MPDO_SH through the monitoring photo diode 309 and the sampling and hold unit 311, each pit.

In operation 403, the controller 301 performs operations on the previously set variables N, J, M, and I, the WRF_SH and the MPDO_SH according to Equation (2) and calculates WRF_Norm.

In operation 404, a base voltage level is determined using a WRF_Norm detected with respect to each pit in the PCA. The base voltage level is a voltage level depending on optimum power. The determined base voltage level is stored in the SRAM 313. A conventional method is used for determining the base voltage level. That is, random data is written to a PCA, a reproduced RF signal is detected with respect to each level of writing power, and optimum power is determined using the sum of a highest level and a lowest level of the reproduced RF signal and a difference between the highest and lowest levels. Where optimum power is determined by such a method, a WRF_Norm corresponding to the determined optimum power is set as a reference WRF_Norm and stored in the SRAM 313.

In operation 405, running OPC is started. Then, in operation 406, the controller 301 extracts MPDO_SH and WRF_SH for each pit while writing actual data to a user area on the optical medium 307. In operation 407, the controller 301 calculates WRF_Norm using the previously set variables N, J, M, and I, like in the operation 403. In other words, the WRF_Norm is calculated by performing operations on the variables N, J, M, and I, the MPDO_SH and the WRF_SH according to Equation (2).

In operation 408, the reference WRF_Norm is compared with the WRF_Norm calculated in operation 407. If the calculated WRF_Norm is not approximate to the reference WRF_Norm, in operation 410 the writing power of the LD 304 is controlled based on a difference between the reference WRF_Norm and the calculated WRF_Norm. The term approximate means that a difference between the calculated WRF_Norm and the reference WRF_Norm does not exceed a predetermined value. Where the difference between the calculated WRF_Norm and the reference WRF_Norm exceeds the predetermined value, the calculated WRF_Norm and the reference WRF_Norm are not-approximate. Specifically, if the reference WRF_Norm is greater than the calculated WRF_Norm, the writing power of the LD 304 is controlled to decrease. If the reference WRF_Norm is less than the calculated WRF_Norm, the writing power of the LD 304 is controlled to increase.

Operation 411 determines whether the write mode is terminated. If the write mode is terminated, the operation ends. However, if the write mode is not terminated, the operation returns to operation 406.

If the calculated WRF_Norm is approximate to the reference WRF_Norm, the writing power is not changed and the operation immediately proceeds to operation 411 for a determination whether the write mode is terminated.

Figure 5:
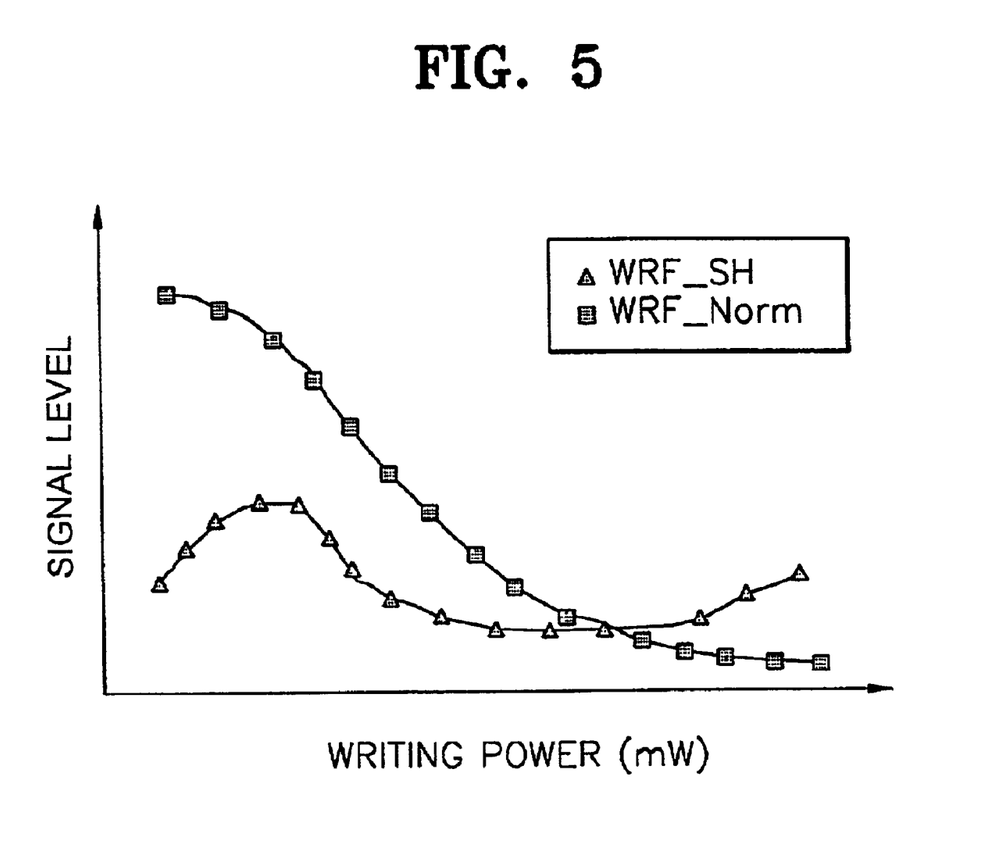
FIG. 5 is a graph of the relation between a sampled and held RF signal corresponding to the quantity of reflected light and writing power according to the present invention.

When writing power is controlled by the method of the present invention, a WRF_SH and a WRF_Norm have a relation as shown in FIG. 5. That is, where the WRF_SH still has a nonlinear characteristic with respect to the writing power as in a conventional art, as illustrated by Δ in FIG. 5, the WRF_Norm having a linear characteristic with respect to the writing power, as illustrated by □ in FIG. 5, is obtained according to the present invention and used to control the writing power of the LD 304.

Figure 6A:
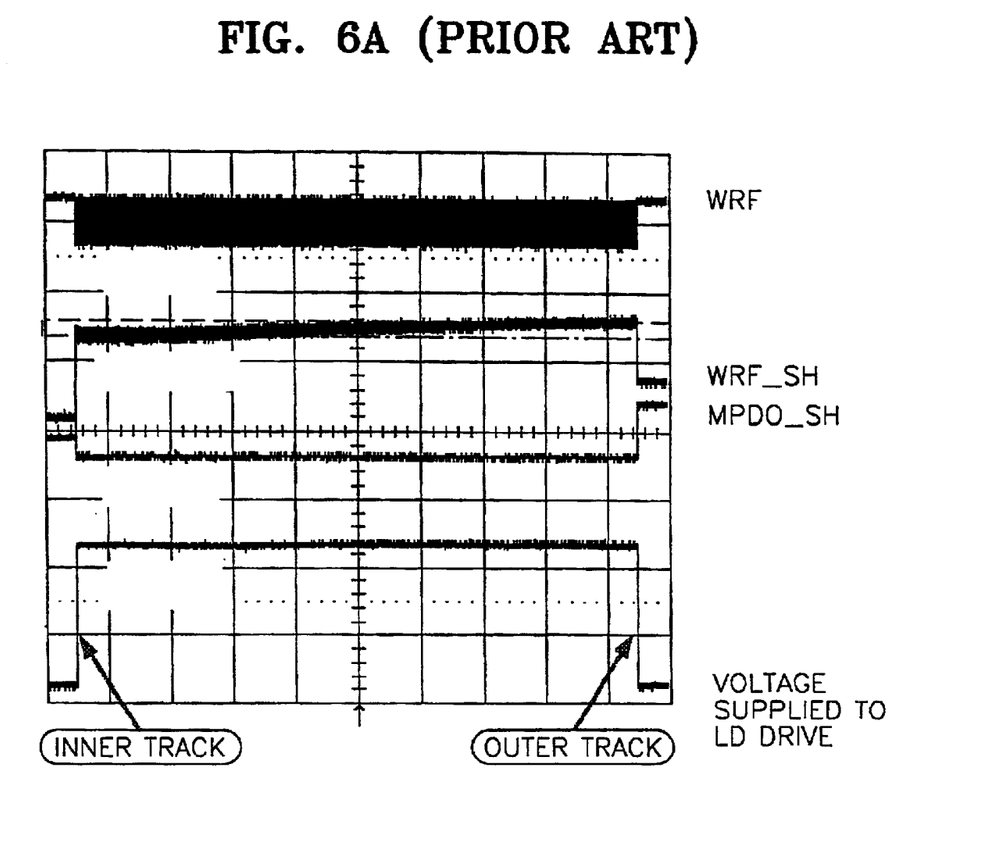
FIG. 6A is a diagram of examples of various output waveforms of main members of the apparatus illustrated in FIG. 3 where conventional running optimum power control (OPC) is performed in the case where an optical drive has skew due to a deck mechanism.

FIG. 6A shows an output signal WRF of the photo diode 308 of FIG. 3, an output signal WRF_SH of the sampling and hold unit 310 connected to the photo diode 308, an output signal MPDO_SH of the sampling and hold unit 311 connected to the monitoring photo diode 309, and an LD driving voltage supplied to the LD drive 303 by the APC 302, where conventional running OPC is performed in the case where an optical drive has skew due to a deck mechanism. The LD driving voltage corresponds to writing power.

Figure 6B:
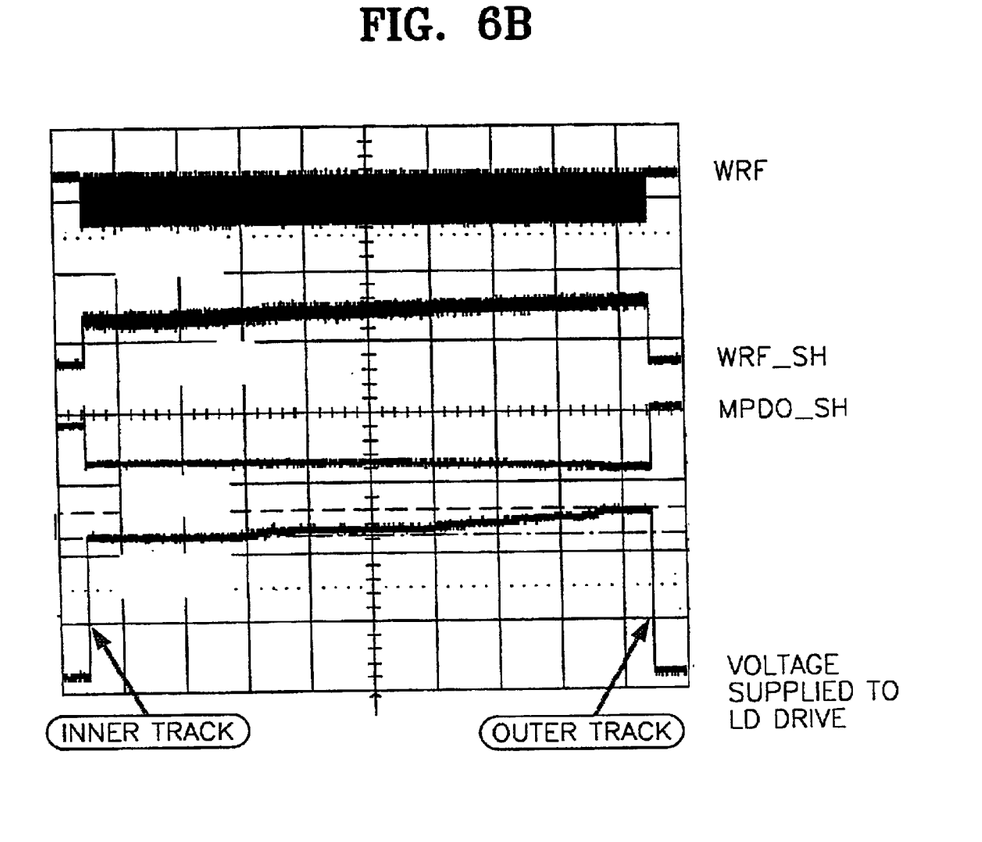
FIG. 6B is a diagram of examples of various output waveforms of main members of the apparatus illustrated in FIG. 3 where running OPC according to the present invention is performed in the case where an optical drive has skew due to a deck mechanism.

FIG. 6B shows the output signal WRF of the photo diode 308 of FIG. 3, the output signal WRF_SH of the sampling and hold unit 310 connected to the photo diode 308, the output signal MPDO_SH of the sampling and hold unit 311 connected to the monitoring photo diode 309, and an LD driving voltage supplied to the LD drive 303 by the APC 302, when running OPC according to the present invention is performed in the case where an optical drive has skew due to a deck mechanism. The LD driving voltage corresponds to writing power.

As shown by comparison of FIGS. 6A and 6B, as a result of performing the running OPC according to the present invention, the difference between the level of an LD driving voltage at the inner track of the optical medium 307 and the level of an LD driving voltage at the outer track according to the present invention is large as compared with the difference of the driving voltage at the inner and outer tracks in a conventional apparatus. Thus, a change in writing power due to skew is compensated in the present invention.

Figure 7A:
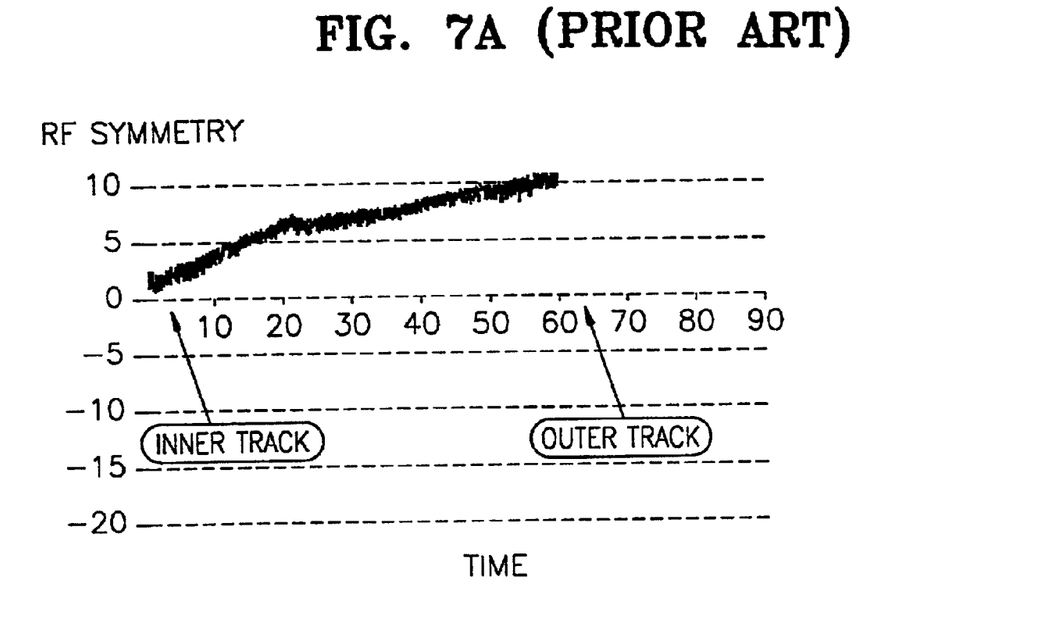
FIG. 7A is a diagram of an example of RF symmetry resulting from conventional running OPC in the case where an optical drive has skew due to a deck mechanism.
Figure 7B:
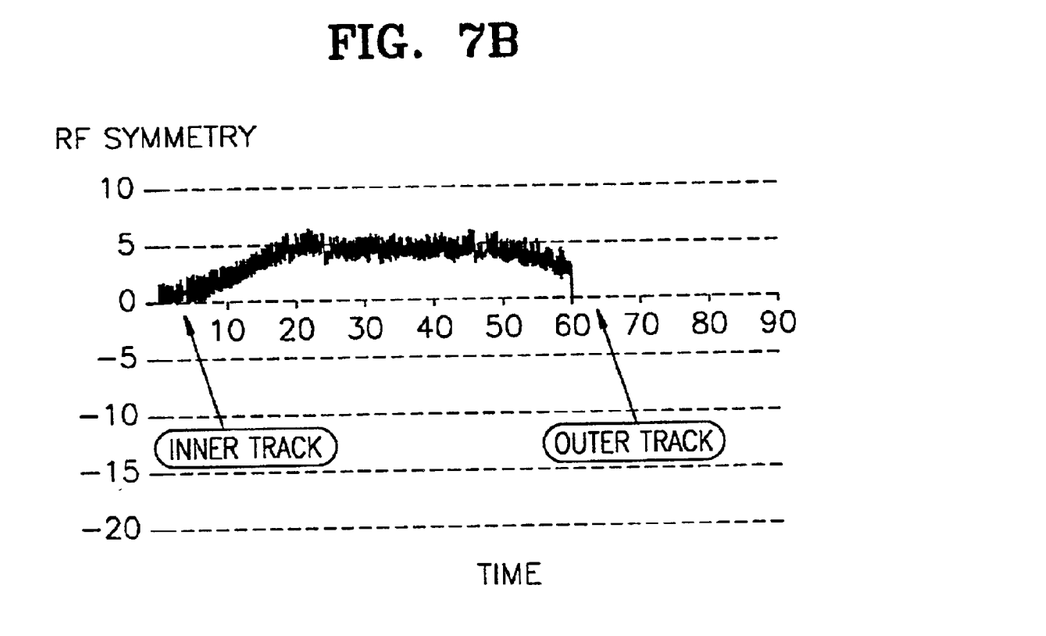
FIG. 7B is a diagram of an example of RF symmetry resulting from running OPC according to the present invention in the case where an optical drive has skew due to a deck mechanism.

FIG. 7A is a diagram of an example of RF symmetry resulting from conventional running OPC in a case where an optical drive has skew due to a deck mechanism. FIG. 7B is a diagram of an example of RF symmetry resulting from running OPC according to the present invention in the case where an optical drive has skew due to a deck mechanism. As shown in FIG. 7A, a difference between RF symmetry at the inner track of the optical medium 307 and RF symmetry at the outer track of the optical medium 307 is large where the writing power of the LD 304 is controlled according to conventional running OPC. However, as shown in FIG. 7B, the difference between RF symmetry at the inner and outer tracks of the optical medium is small where running OPC according to the present invention is performed.

According to the present invention, a WRF_Norm having a sufficient dynamic range for an optical drive and having a linear characteristic with respect to writing power is obtained, and running OPC is performed using the obtained WRF_Norm so that the writing power of an LD is controlled such that an optimum writing characteristic is attained where the writing environment of the optical drive changes. As a result, a difference in a writing characteristic between inner and outer tracks on an optical medium is considerably reduced where skew due to the disc or deck mechanism exists. In addition, a change in the writing power of an LD is compensated within several tens of micro seconds even where data is written immediately to a middle or an outer track on an optical medium in a state in which such skew exists. Moreover, a change in writing power is compensated so that a writing characteristic is not degraded even at a deviation of ±0.5 mm on a disc. Even if the wavelength of an LD changes due to high temperature, since the ±0.5 mm deviation has little influence on the peak level of a WRF_Norm, a satisfactory writing characteristic is attainable.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling optimum writing power of a light source which emits a beam to write data to an optical medium in an optical drive, the method comprising:

detecting a first normalized write signal by using predetermined condition values while writing random data to a test area on the optical medium, and setting the first normalized write signal as a reference signal;

detecting a second normalized write signal using the predetermined condition values, while writing data to a user area on the optical medium; and controlling the writing power of the light source based on a comparison of the second normalized write signal and the first normalized write signal.

2. The method of claim 1, wherein the predetermined condition values comprise:

a first gain and a first offset, which are used to control a level of a first signal obtained by sampling and holding a signal corresponding to a quantity of light reflected from the optical medium, and a second offset and a second gain, which are used to control a level of a signal obtained by sampling and holding a signal obtained by monitoring the quantity of light radiated toward the optical medium by the light source.

3. The method of claim 1, wherein the first and second normalized signals are detected according to:

$$WRF\_Norm = \frac{WRF\_SH \times N - J}{MPDO\_SH \times M - I}$$

where $WRF_{13}$ Norm indicates the first or second normalized write signal, $WRF_{13}$ SH indicates a sampled and held write signal corresponding to a quantity of light reflected from the optical medium, N and J indicate a slope and an offset, respectively, which control a level of a sampled and held signal corresponding to the quantity of light reflected from the optical medium, J is an integer, $MPDO_{13}$ SH indicates a signal obtained by sampling and holding a signal obtained by monitoring a quantity of light radiated by the light source, M and I indicate a gain and an offset, respectively, which control a level of the signal obtained by sampling and holding the signal obtained by monitoring the quantity of light radiated by the light source, and l is an integer.

4. The method of claim 1, wherein the controlling of the writing power of the light source comprises determining a difference between the second normalized write signal and the reference signal where a value of the second normalized write signal is not approximate a value of the reference signal.

5. An apparatus for controlling writing power of a light source which emits a beam to write data to an optical medium in an optical drive, the apparatus comprising:

a first sampling and hold unit which samples and holds a signal corresponding to a quantity of light reflected from the optical medium; a second sampling and hold unit which samples and holds a signal obtained by monitoring a quantity of light radiated by the light source; and a controller which performs operations based on predetermined condition values, which are set taking into account the dynamic ranges of monitored writing power and a write radio frequency (RF) signal, deficiency in the dynamic ranges not being compensated for in hardware in the optical drive, and on the signals output from the first and second sampling and hold units, to detect a normalized write signal having a linear characteristic with respect to a writing power of the light source, and which controls the writing power of the light source in a write mode.

6. The apparatus of claim 5, wherein the predetermined condition values comprise a slope and a first offset, which are used to control a level of the signal output from the first sampling and hold unit, and a second offset and a gain, which are used to control a level of the signal output from the second sampling and hold unit.

7. The apparatus of claim 5, wherein the controller detects the normalized write signal by performing operations on an output signal of the first sampling and hold unit and an output signal of the second sampling and hold unit according to:

$$WRF\_Norm = \frac{WRF\_SH \times N - J}{MPDO\_SH \times M - I}$$

where $WRF_{13}$ Norm is the normalized write signal, $WRF_{13}$ SH is the output signal of the first sampling and hold unit, $MPDO_{13}$ SH is the output signal of the second sampling and hold unit, N and J indicate a slope and a first offset, respectively, which control a level of the output signal of the first sampling and hold unit, J is an integer, M and I indicate a gain and a second offset, respectively, which control a level of the output signal of the second sampling and hold unit, and I is an integer.

8. The apparatus of claim 5, wherein the controller:

sets a first normalized write signal, which is detected using the predetermined condition values while writing random data to a first area on the optical medium, as a reference signal, and controls the writing power of the light source depending on a result of determining whether a second normalized write signal is approximate to the reference signal, the second normalized write signal being detected using the predetermined condition values while the controller writes data to a user area on the optical medium.

9. A method of controlling optimum writing power of a light source which emits a beam to write data to an optical medium in an optical drive, the method comprising:

writing first data to a test area of the recording medium based on predetermined conditions;

detecting a first normalized write signal while writing the first data to the test area, and setting the first normalized write signal as a reference level;

detecting a second normalized write signal while writing second data to a user area on the optical medium;

comparing a level of the second normalized write signal to the reference level; and adjusting the writing power of the light source based on whether the level of the second normalized write signal is approximate the reference level.

10. An apparatus for controlling optimum writing power of a light source which emits a beam to write data to an optical medium in an optical drive, the apparatus comprising:

a first sampling and hold unit which samples and holds a signal corresponding to a quantity of light reflected from the optical medium during a write operation;

a second sampling and hold unit which samples and holds a signal obtained by monitoring a quantity of light radiated toward the optical medium during the write operation; and a controller which controls the optical drive and the first and second sampling and hold units to:

acquire a first set of the first and second sampled and held signals with respect to light radiated toward a test area of the optical medium to establish a reference signal level based on a ratio of the first sampled and held signal of the first set to the second sampled and held signal of the first set;

acquire a second set of the first and second sampled and held signals with respect to light radiated toward a user area of the optical medium during a write operation to determine a current signal level based on a ratio of the first sampled and held signal of the second set to the second sampled and held signal of the second set; and alter the writing power of the light source where the current signal level and the reference level differ by more than a predetermined amount.

11. The method of controlling optimum writing power as claimed in claim 1, wherein the controlling further comprises changing the writing power where the first and second normalized write signals are not approximate in value.

12. The method of controlling optimum writing power as claimed in claim 1, wherein the predetermined condition values are set taking into account dynamic ranges of monitored writing power and a write radio frequency (RF) signal, and deficiency in the dynamic ranges not being compensated for in hardware in the optical drive.

13. The method of claim 1, further comprising storing a value of the first normalized write signal.

14. The apparatus of claim 5, further comprising a memory to store the normalized write signal.

15. The apparatus of claim 14, wherein the memory comprises a static random access memory.

* * * * *

UNITED STATES PATENT AND TRADEMARK OFFICE
CERTIFICATE OF CORRECTION

PATENT NO. : 6,920,097 B2
DATED : July 19, 2005
INVENTOR(S) : Joo-youp Kim It is certified that error appears in the above-identified patent and that said Letters Patent is hereby corrected as shown below:

<u>Column 8,</u>
Lines 5 and 59, change "$WRF_{13}Norm$" to -- $WRF\_Norm$ --.
Lines 6 and 59-60, change "$WRF_{13}SH$" to -- $WRF\_SH$ --.
Lines 11 and 61, change "$MPDO_{13}SH$" to -- $MPDO\_SH$ --.

Signed and Sealed this

Fourteenth Day of March, 2006

JON W. DUDAS
*Director of the United States Patent and Trademark Office*